(12) United States Patent
Frazier et al.

(10) Patent No.: US 8,972,506 B2
(45) Date of Patent: Mar. 3, 2015

(54) CONVERSATION MAPPING

(75) Inventors: Kristopher T. Frazier, Frisco, TX (US);
Brian F. Roberts, Dallas, TX (US);
Heath Stallings, Colleyville, TX (US)

(73) Assignee: Verizon Patent and Licensing Inc.,
Basking Ridge, NJ (US)

( * ) Notice: Subject to any disclaimer, the term of this patent is extended or adjusted under 35 U.S.C. 154(b) by 1524 days.

(21) Appl. No.: 12/335,033

(22) Filed: Dec. 15, 2008

(65) Prior Publication Data
US 2010/0153106 A1 Jun. 17, 2010

(51) Int. Cl.
*G06F 15/16* (2006.01)
*G06F 17/30* (2006.01)
*G10L 15/26* (2006.01)

(52) U.S. Cl.
CPC .... G06F 17/30746 (2013.01); G06F 17/30749 (2013.01); *G10L 15/26* (2013.01)
USPC ............................................... 709/206

(58) Field of Classification Search
CPC .......... G06N 5/00; G06N 5/02; G06N 5/022; G06N 5/04; G06Q 10/10; H04L 67/02
USPC ....................................................... 709/206
See application file for complete search history.

(56) References Cited

U.S. PATENT DOCUMENTS

| | | | | |
|---|---|---|---|---|
| 5,151,940 | A * | 9/1992 | Okazaki et al. | 704/253 |
| 6,870,828 | B1 * | 3/2005 | Giordano, III | 370/352 |
| 7,158,980 | B2 * | 1/2007 | Shen | 1/1 |
| 7,505,163 | B2 * | 3/2009 | Hart et al. | 358/1.15 |
| 7,711,550 | B1 * | 5/2010 | Feinberg et al. | 704/9 |
| 7,716,163 | B2 * | 5/2010 | Reynar et al. | 707/739 |
| 2003/0041112 | A1 * | 2/2003 | Tada et al. | 709/206 |
| 2004/0073424 | A1 * | 4/2004 | Geppert et al. | 704/235 |
| 2005/0021624 | A1 * | 1/2005 | Herf et al. | 709/204 |
| 2007/0050456 | A1 * | 3/2007 | Vuong et al. | 709/206 |
| 2007/0271340 | A1 * | 11/2007 | Goodman et al. | 709/206 |
| 2008/0028323 | A1 * | 1/2008 | Rosen et al. | 715/752 |

OTHER PUBLICATIONS

Nardi, et al. "Collaborative, Programmable Intelligent Agents." Communications of the ACM: vol. 41, No. 3 (Mar. 1998). pp. 96-104.*

Co-pending U.S. Appl. No. 12/412,555, filed Mar. 27, 2009, entitled "Conversation Support", by Kristopher T. Frazier et al., 45 pages.

* cited by examiner

*Primary Examiner* — Christopher Biagini

(57) ABSTRACT

A method may include receiving communications associated with a communication session. The communication session may correspond to a telephone conversation, text-based conversation or a multimedia conversation. The method may also include identifying portions of the communication session and storing the identified portions. The method may further include receiving a request to retrieve information associated with the communication session and providing to a display, information associated with the identified portions.

24 Claims, 9 Drawing Sheets

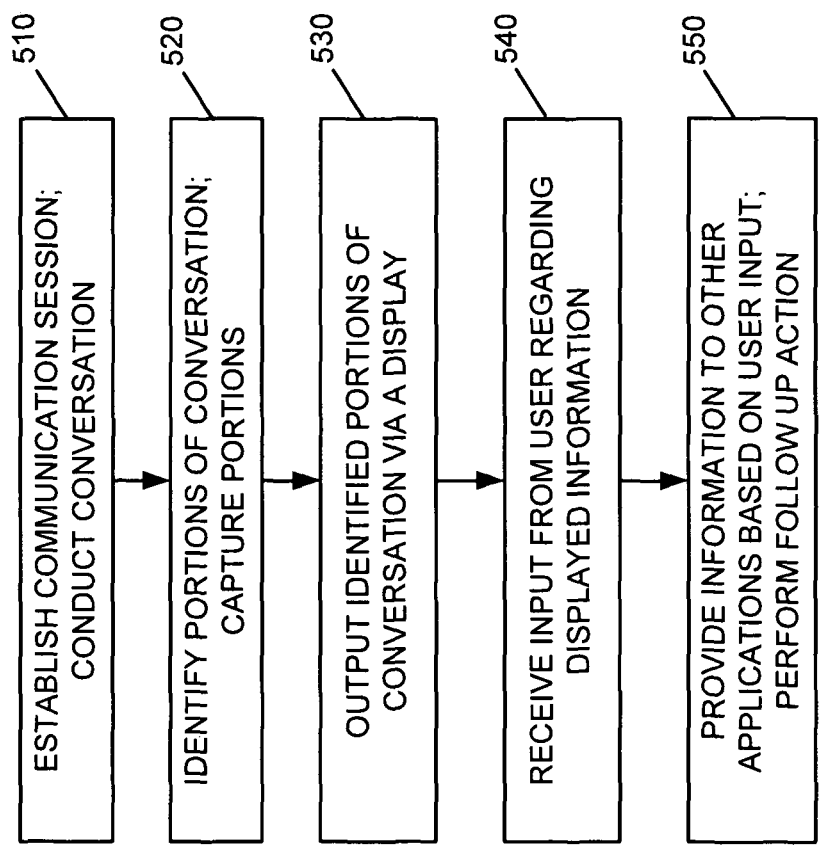

700

710 — Joe: Hey BILL, How are things going at work?

720 — Me: Things are fine, but we're still having SERVER PROBLEMS.

730 — Joe: We had SERVER PROBLEMS last week and we found out it was the new PATCH we installed. Did you try to uninstall the PATCH.

740 — Me: Thanks JOE, we'll try that.

750 — Joe: Let's MEET at 9:00 TOMORROW at STARBUCKS right down the street from your office, you know which one I'm talking about right?

760 — Me: Yes, see you then JOE.

770 — Joe: See you then.

FIG. 7

CONVERSATION MAPPING

BACKGROUND INFORMATION

During the course of a typical day, the average person may have dozens of conversations, including telephone conversations and text-based conversations (e.g., email, instant message, text message), with various people. At the end of the day, or even hours later, it is often difficult for the person to recall details of the conversations. It is also very easy for a person to confuse conversations with different parties.

BRIEF DESCRIPTION OF THE DRAWINGS

FIG. 5 is a flow diagram illustrating exemplary processing by various devices illustrated in FIG. 1;

FIG. 7 is another exemplary output associated with the processing of FIG. 5;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to extracting information from conversations or other communications between two or more parties. For example, certain key words of a conversation may be extracted and stored for later retrieval. The extracted information may also be displayed to provide a chronological and/or visual representation of the conversation. In some implementations, the extracted information may be provided to other applications for automatically performing various tasks, such as setting up a meeting, adding a contact to a contacts list, retrieving information, etc.

Figure 1:
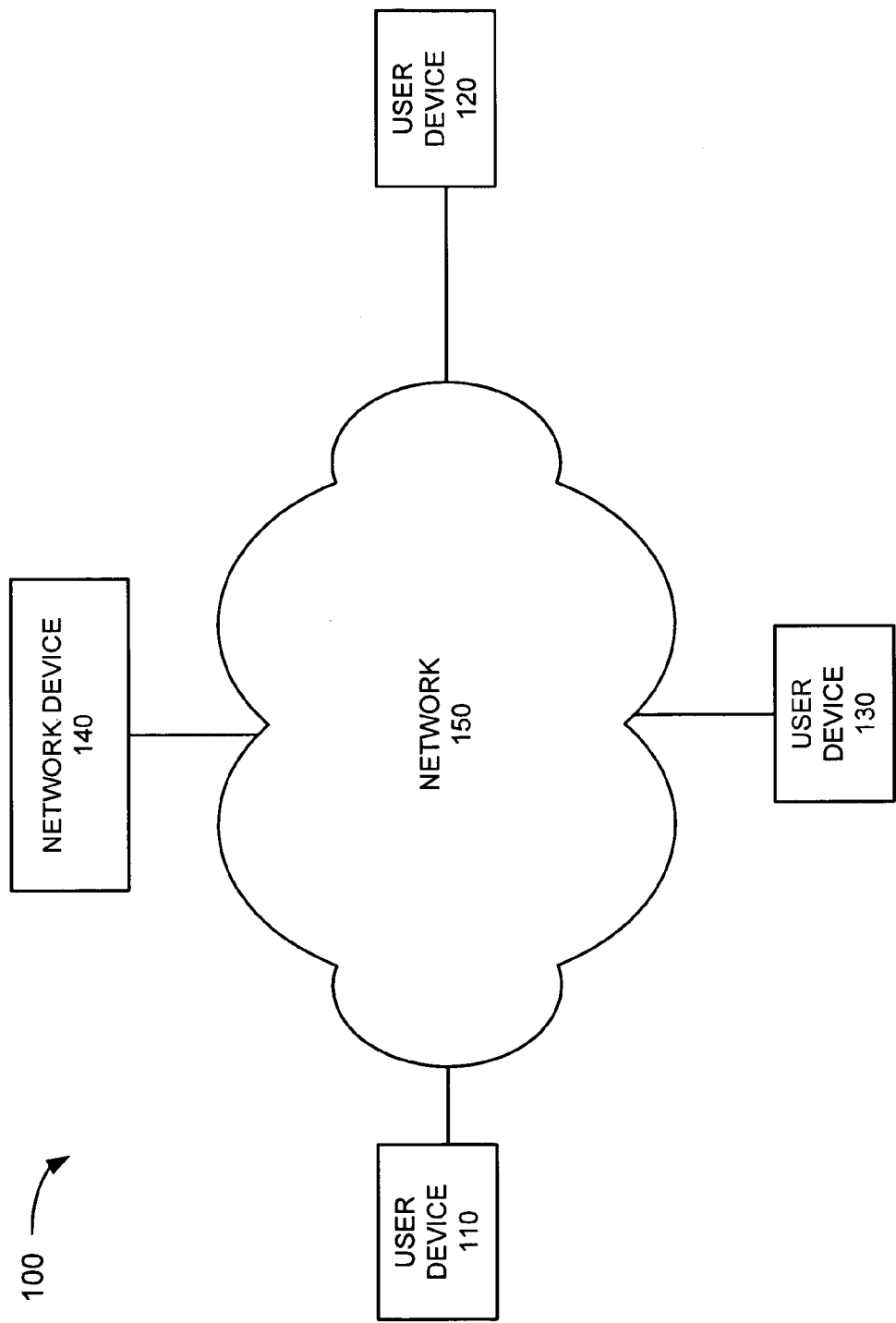
FIG. 1 illustrates an exemplary network in which systems and methods described herein may be implemented.

FIG. 1 is a block diagram of an exemplary network 100 in which systems and methods described herein may be implemented. Network 100 may include user devices 110, 120 and 130, network device 140 and network 150.

Each of user devices 110-130 may include any device or combination of devices capable of transmitting voice signals and/or data to a network, such as network 150. In one implementation, user devices 110-130 may include any type of communication device, such as a plain old telephone system (POTS) telephone, a voice over Internet protocol (VoIP) telephone (e.g., a session initiation protocol (SIP) telephone), a wireless or cellular telephone device (e.g., a personal communications system (PCS) terminal that may combine a cellular radiotelephone with data processing and data communications capabilities, a personal digital assistant (PDA) that can include a radiotelephone, or the like), etc. In another implementation, user devices 110-130 may include any type of computer device or system, such as a personal computer (PC), a laptop, a PDA, a wireless or cellular telephone that can communicate via telephone calls and/or text-based messaging (e.g., text messages, instant messaging, email, etc.). User devices 110-130 may connect to network 150 via any conventional technique, such as wired, wireless, or optical connections.

Network device 140 may include one or more computing devices, such as one or more servers, computers, etc., used to receive call-related information from other devices in network 100. For example, network device 140 may receive information extracted from a conversation between various parties associated with user devices 110-130, as described in detail below.

Network 150 may include one or more wired and/or wireless networks that are capable of receiving and transmitting data, voice and/or video signals, including multimedia signals that include voice, data and video information. For example, network 150 may include one or more public switched telephone networks (PSTNs) or other type of switched network. Network 150 may also include one or more wireless networks and may include a number of transmission towers for receiving wireless signals and forwarding the wireless signals toward the intended destinations. Network 150 may further include one or more packet switched networks, such as an Internet protocol (IP) based network, a local area network (LAN), a wide area network (WAN), a personal area network (PAN), an intranet, the Internet, or another type of network that is capable of transmitting data.

The exemplary configuration illustrated in FIG. 1 is provided for simplicity. It should be understood that a typical network may include more or fewer devices than illustrated in FIG. 1. For example, network 100 may include additional elements, such as switches, gateways, routers, etc., that aid in routing traffic, such as telephone calls, from user devices 110-130 to their respective destinations in network 100. In addition, although user devices 110-130 and network device 140 are shown as separate devices in FIG. 1, in other implementations, the functions performed by two or more of user devices 110-130 and network device 140 may be performed by a single device or platform. For example, in some implementations, the functions described as being performed by one of user devices 110-130 and network device 140 may be performed by one of user devices 110-130.

Figure 2:
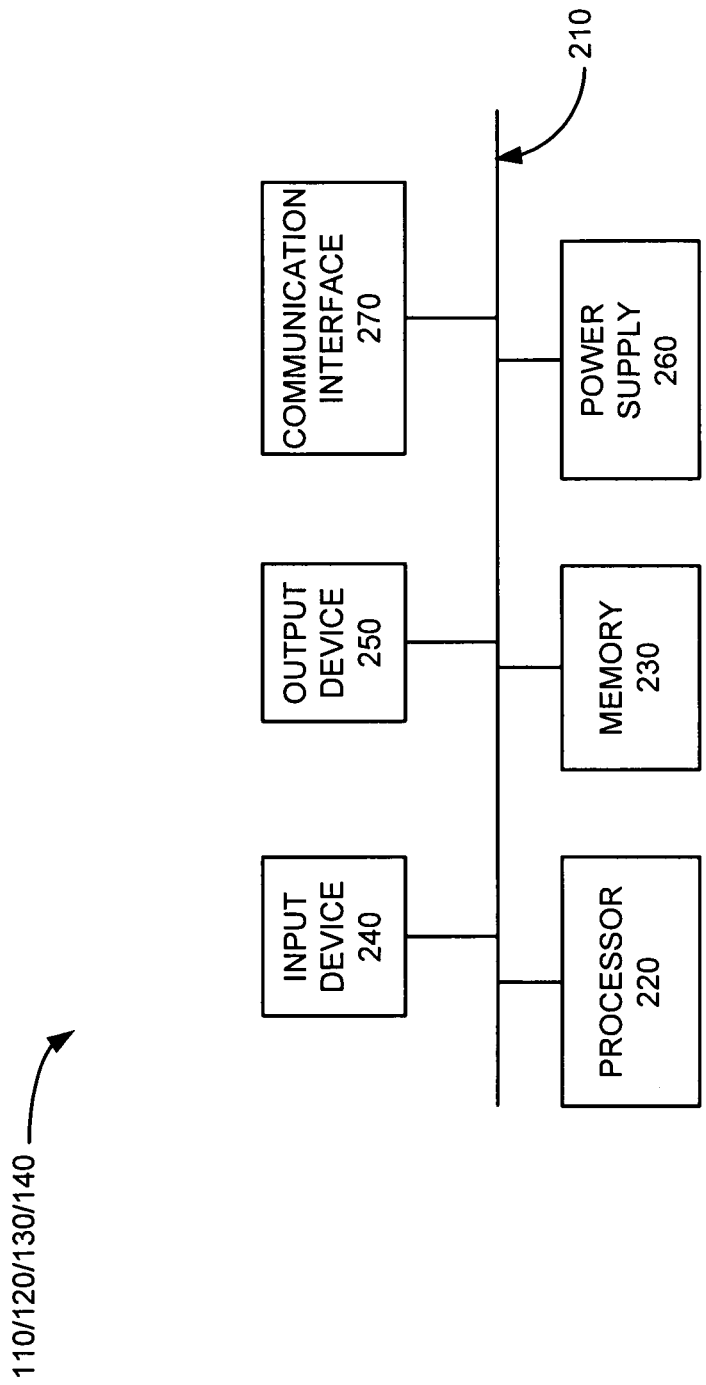
FIG. 2 illustrates an exemplary configuration of a user device or network device of FIG. 1.

FIG. 2 illustrates an exemplary configuration of user device 110. User devices 120 and 130 and network device 140 may be configured in a similar manner. Referring to FIG. 1, user device 110 may include a bus 210, a processor 220, a memory 230, an input device 240, an output device 250, a power supply 260 and a communication interface 270. Bus 210 may include a path that permits communication among the elements of user device 110.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a magnetic and/or optical recording medium and its corresponding drive.

Input device 240 may include a mechanism that permits a user to input information to user device 110, such as a keyboard, a keypad, a mouse, a pen, a microphone, a touch screen, voice recognition and/or biometric mechanisms, etc. Output device 250 may include a mechanism that outputs information to the user, including a display, a printer, a speaker, etc. Power supply 260 may include a battery or other power source used to power user device 110.

Communication interface 270 may include any transceiver-like mechanism that user device 110 may use to communicate with other devices (e.g., user devices 120/130 or network device 140) and/or systems. For example, communication interface 270 may include mechanisms for communicating via network 150, which may include a wireless network. In these implementations, communication interface 270 may include one or more radio frequency (RF) transmitters, receivers and/or transceivers and one or more antennas for transmitting and receiving RF data via network 150. Communication interface 270 may also include a modem or an Ethernet interface to a LAN. Alternatively, communication interface 270 may include other mechanisms for communicating via a network, such as network 150.

User device 110 may perform processing associated with conducting communication sessions. For example, user device 110 may perform processing associated with making and receiving telephone calls, sending and receiving electronic mail (email) messages, text messages, instant messages (IMs), mobile IMs (MIMs), short message service (SMS) messages, etc. User device 110, as described in detail below, may also perform processing associated with extracting information from various communication sessions and providing the extracted information to a user and/or to other applications executed by user device 110. User device 110 may perform these operations in response to processor 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), solid state drive (SSD) etc.), or from another device via communication interface 270. Alternatively, hard-wired circuitry may be used in place of or in combination with software instructions to implement processes consistent with the implementations described herein. Thus, implementations described herein are not limited to any specific combination of hardware circuitry and software.

Figure 3:
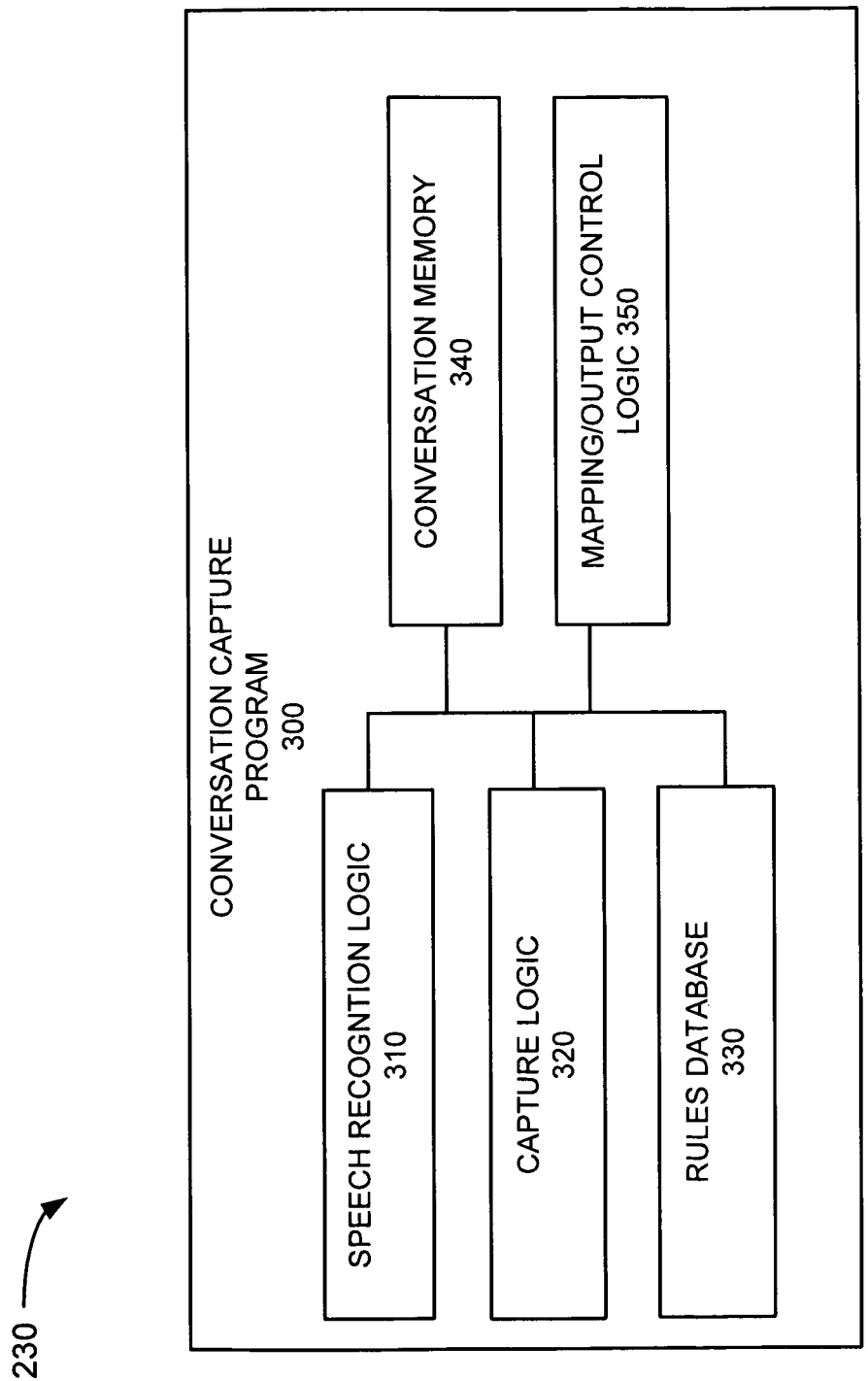
FIG. 3 illustrates an exemplary configuration of logic components implemented in the device of FIG. 2.

FIG. 3 is an exemplary functional block diagram of components implemented in user device 110 of FIG. 2, such as by processor 220 executing a program stored in memory 230. Referring to FIG. 3, a conversation capture program 300 may be stored in memory 230. Conversation capture program 300 may include a software program that extracts portions of conversations, such as portions of phone calls and text-based communication sessions, involving the user of user device 110. In an exemplary implementation, conversation capture program 300 may include speech recognition logic 310, capture logic 320, rules database 330, conversation memory 340 and mapping/output control logic 350. Conversation capture program 300 and its various logic components are shown in FIG. 3 as being included in user device 110. In alternative implementations, these components or a portion of these components may be located externally with respect to user device 110. For example, in some implementations, one or more of the components of conversation capture program 300 may be located in or executed by network device 140.

Speech recognition logic 310 may include logic to perform speech recognition on voice data provided by one or more parties during a conversation. For example, speech recognition logic 310 may convert voice data from parties involved in a telephone conversation, such as parties at user devices 110 and 120, into text corresponding to the voice data. Capture logic 320 may then extract information from the conversation, as described below.

Capture logic 320 may interact with other logic components of conversation capture program 300 to extract certain portions of a conversation between parties. For example, capture logic 320 may interact with rules database 330 to identify words and/or phrases that most likely correspond to times, locations, people, actions, topics, etc. As one example, rules database 330 may store rules that indicate that audio input or text input that corresponds to two numbers consecutively received, or possibly separated by a colon or a period, corresponds to a time of day. For example, audio input of "nine thirty" or text input of 9:30 typically corresponds to a time of day. Further, terms that end in "o'clock," such as "ten o'clock," typically correspond to times of day. In addition, terms, such as morning, afternoon, evening, etc., typically correspond to general times of day. Still further, words, such as today, tomorrow, yesterday, etc., as well as words, such as Sunday, Monday, etc., refer to days of the week, either explicitly (e.g., "Monday" or relative to a current day of the week, such as tomorrow). In these cases, rules database 330 may store rules indicating that capture logic 320 is to capture or extract portions of a conversation that correspond to times of day, days of the week, months of the year, etc. This information may be stored in conversation memory 340.

Figure 4:
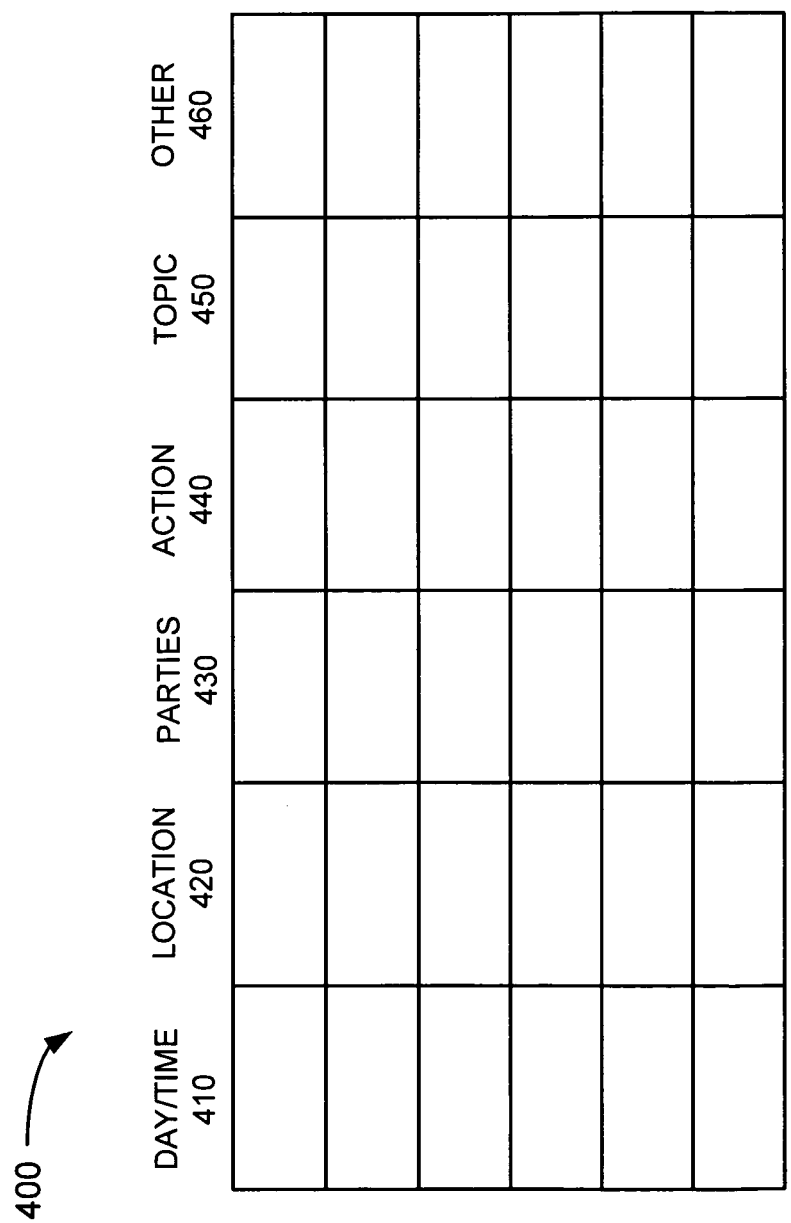
FIG. 4 illustrates an exemplary structure of a database stored in one of the devices of FIG. 1.

For example, conversation memory 340 may include one or more memories that store communications and/or captured portions of communications between various parties. For example, conversation memory 340 may include a database 400 of entries associated with conversations between the user of user device 110 and other parties, as illustrated in FIG. 4. Referring to FIG. 4, database 400 may include day/time field 410, location field 420, parties field 430, action field 440, topic field 450 and other field 460. As described above, capture logic 320 may extract information corresponding to a day and/or time from a conversation. Capture logic 320 may store this information in day/time field 410.

Capture logic 320 may also capture location information. For example, rules database 330 may store rules that indicate that numbers and words that immediately follow the numbers, often correspond to an address. For example, the phrase "one two three Main," includes numbers (i.e., 123), followed by one word (i.e., Main). In this case, capture logic 310 may identify the phrase "one two three main" as corresponding to an address of 123 Main. Rules database 330 may also store rules that indicate that one or more words that precede any of the words "street," "avenue," "boulevard," etc., typically correspond to addresses. In this case, capture logic 320 may capture these terms along with one or more words that precede these terms. Capture logic 320 may store this information in location field 420 of database 400.

Rules database 330 may also store a database or be associated with one or more databases that includes names of cities, states, countries, names of places, such as retail establishments (e.g., restaurants, shopping malls, stores, etc.), schools, parks, etc. In such instances, capture logic 320 may compare the names uttered or text-inputted during a conversation to the names in rules database 330 and capture terms or phrases that correspond to locations. Capture logic 320 may also store this information in location field 420 of database 400.

Rules database 330 may also includes rules that identify various names, such as names of people, terms that indicate a relationship, such "Mom," "brother," "son,", etc. In such implementations, capture logic 320 may capture these names and/or relationship-related terms and store this information in parties field 430 of database 400.

Rules database 330 may also include rules that indicate that capture logic 320 is to extract certain action-related words. For example, terms/phrases, such as "meet me," "meeting," "play basketball," "cancel," "call me," etc., often refer to setting up a meeting/event or a follow up communication between two parties at a later time. Capture logic 320 may store these action-related words/phrases in action field 440 of database 400.

Capture logic 320 may also capture topic-related information associated with a conversation. For example, rules database 330 may indicate that terms/phrases frequently spoken during a communication session often refer to a general topic of the conversation. For example, if parties in a conversation refer to a term more than a predetermined number of times (e.g., two or more), this term may correspond to a topic of the conversation. As an example, suppose that parties at user devices 110 and 120 are conducting a conversation and refer to a "server problem" several times. In this case, capture logic 320 may extract the term "server problem" from the conversation and store each occurrence of this phrase in topic field 450 of database 400. As another example, suppose that the parties use the term "birthday party" a number of times during the conversation. In this case, capture logic 320 may capture each occurrence of the term "birthday party" and store this information in topic field 450.

Capture logic 320 may also capture or extract other information from a conversation. For example, rules database 330 may include rules indicating that capture logic 320 is to capture information, such as telephone numbers, IP addresses and other contact-related information for parties in a conversation. In this case, rules database 330 may indicate that seven or more digits spoken consecutively or input via text in a string correspond to a telephone number. Rules database 330 may further indicate that phrases ending in "dot com" refer to an IP address. Similarly, a first input string or sequence of letters/numbers followed by a second input string or sequence of letters/numbers separated by the term "at" or the symbol "@" may be identified as an email address. In such instances, capture logic 320 may capture the telephone number and/or IP address and store this information in other field 460.

Other field 460 may also store a date and/or time associated with each conversation. Other field 460 may further include parties associated with each conversation. For example, other field 460 may store information indicating the party that initiated the conversation, or the party that received the initial communication. This information may be obtained using a contact list/address book stored on user device 110. That is, capture logic 320 may identify the party at user device 120 involved in a conversation based on the telephone number, email address, IM user name, etc., associated with user device 120.

In each case, capture logic 320 may capture the desired information based on various rules and/or databases stored in, for example, rules database 330. Capture logic 320 may store this information in database 400 of conversation memory 340. In addition, capture logic 320 may store time-related information associated with the information stored in database 400 to allow the information to be displayed at a later time in a chronological order with respect to when the terms/phrases were uttered or text inputted during the conversation, as described in detail below.

Mapping/output control logic 350 may include logic that maps captured portions of a conversation, such as key words/phrases stored in database 400 into data representations that may be provided to a user of user device 110 via output device 250, such as a display. Mapping/output control logic 350 may also allow the user to confirm various information displayed to the user on output device 250 and/or provide follow up interaction with the user and/or other applications stored on user device 110 based on the extracted information and/or confirmation information provided by the user, as described below.

Conversation capture program 300 may populate information in conversation database 400 during conversations. Conversation capture program 300 may also provide the extracted information to the user in a variety of ways that facilitate recall of various information, as well as provide for follow up actions regarding the conversation, as described in detail below.

FIG. 5 is a flow diagram illustrating exemplary processing associated with capturing or extracting portions of a conversation between parties in network 100. Processing may begin with a user of user device 110 initiating communications with another party, such as placing a phone call or sending a text-based message, or receiving a communication from another party. For example, assume that a party at user device 110 places a telephone call to a party at user device 120 and establishes a voice-based communication session with the party at user device 120. Further assume that an ensuing conversation takes place (act 510).

As the parties at user devices 110 and 120 are talking to each other, conversation capture program 300 may identify portions of the conversation (act 520). For example, speech recognition logic 310 may convert speech from the parties at user devices 110 and 120 into corresponding text. Capture logic 320 may then extract portions of the text using rules stored in rules database 330 (act 520).

For example, as discussed above with respect to FIG. 3, capture logic 320 may identify words and/or phrases that most likely correspond to times and locations. As one example, assume that Joe, a party at user device 120, says to Bill, a party at user device 110, the following: "You and I are going to meet at 9:00 tomorrow at Starbucks right down the street from your office, you know which one I'm talking about, right?" Further assume that Bill at user device 110, says "yes, see you then Joe," followed by Joe at user device 120 saying "See you then."

In this case, speech recognition logic 310 may convert the voice input by Joe and Bill into text and forward the text to capture logic 320. Capture logic 320 may identify the term "meet" as corresponding to a potential action-related term or action item involving a meeting. Capture logic 320 may store the term "meet" in action field 440 of database 400. Capture logic 320 may also identify the term "nine oclock" (i.e., 9:00) as corresponding to a time and the term "tomorrow" as corresponding to a particular day. Capture logic 320 may store these terms in day/time field 410.

In this example, capture logic 320 may further identify the term "Starbucks" as corresponding to the name of a retail establishment and may store this information in location field 420.

Other terms in the conversation may not be identified as being particularly relevant or as corresponding to information that meets or satisfies a rule stored in rules database 330. For example, the phrase "right down the street from your office" may not correlate to a particular address since the phrase does not include a street name. That is, even though the term "street" is included in this phrase, the term "street" is not preceded by or proximate to an explicit numerical portion of an address. Therefore, capture logic 320 may not identify this phrase as being relevant for storing in database 400. However, in some instances, capture logic 320 may automatically access a web search program to identify one or more addresses of retail establishments corresponding to "Starbucks" based on location information associated with user device 110 and/or user device 120. For example, assume that user device 110 is equipped with a global positioning system (GPS) receiver and is able to identify its location. In this case, capture logic 320 may input the name "starbucks" into a web-based search program and identify the location of one or more Starbucks coffee shops that is located close to the location of user device 110. Alternatively, if capture logic 320 is aware of a location associated with user device 120, such as a home or office address of the user of user device 120, capture logic 320 may locate one or more Starbucks coffee shops that is located close to the location of user device 120.

Capture logic 320 may also identify the name "Joe" from the conversation and store this information in parties field 430. In some instances, capture logic 320 may access a contacts list/address book program and attempt to identify additional information corresponding to "Joe." In addition, in some instances, capture logic 320 may use the telephone number associated with Joe (or user device 120) to further correlate Joe to other information associated with Joe, such as Joe's home or work address. Still further, in some instances in which Joe's telephone number and/or address are not known, capture logic 320 may enter Joe's full name in a web-based search program to attempt to identify Joe's telephone number and/or address.

Figure 6A:
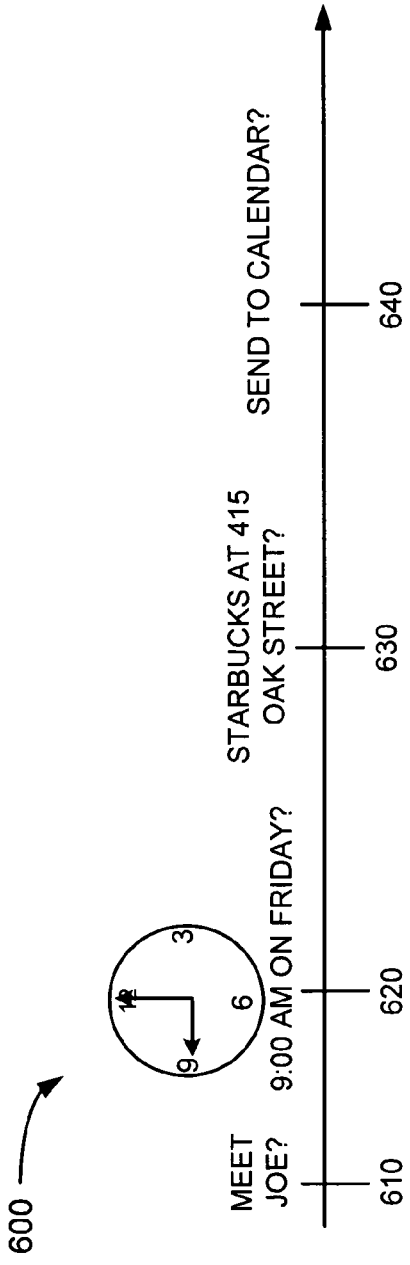
FIGS. 6A and 6B are exemplary outputs associated with the processing of FIG. 5.

Mapping/output control logic 350 may access database 400 and output portions of the information stored in database 400 to the user of user device 110 via output device 250, such as a display (act 530). For example, in one implementation, mapping/output control logic 350 may output a graphical representation of portions of the conversation in a timeline-like manner. For example, FIG. 6A illustrates an exemplary representation 600, also referred to herein as timeline 600, output by mapping/output control logic 350 to output device 250, which may be a display, such as a liquid crystal display (LCD) or some other type of display. Referring to FIG. 6A, timeline 600 may include portions of the information identified by capture logic 320 displayed in a chronological manner with respect to when the identified portions were spoken (or text inputted) during the conversation. That is, capture logic 320 may store a time tag with each piece of information stored in database 400 that allows the identified information to be displayed in the order in which the terms were stored. In some instances, the time tag may indicate a relative time, while in other instances, the time tag may be an absolute time (e.g., real world time).

In an exemplary implementation, timeline 600 may include extracted portions of the conversation that may include queries that allow the user to respond to the displayed information or select portions of the displayed information (act 540). For example, timeline 600 may include the query "Meet Joe?" at point 610. This query/information corresponds to the information stored in action field 440 (i.e., meet) and the information stored in parties field 430 (i.e., Joe). As discussed above, in some instances, the information displayed in timeline 600 may be chronological in nature, while in other instances various information, such as the name "Joe" may be combined with the most likely other word or term. For example, since the user of user device 110 called Joe and the name Joe was uttered later in the conversation, mapping/output control logic 350 may combine the name "Joe" with "meet," as illustrated in FIG. 6A, since Joe would be the most likely party involved in the meeting. In other instances, since the term "Joe" was not identified until later in the conversation, Joe would be displayed chronologically at a later point in timeline 600.

Timeline 600 may allow the user to select or enter "yes" or "no" in response to the query at point 610. Assume that the party at user device 110 selects "yes" to the query at point 610 (act 540). Point 620 on timeline 620 may display a clock and/or a label displaying a time associated with the meeting (i.e., "9:00 AM on Friday?"). In this case, capture logic 320 and/or mapping/output control logic 350 may modify the term "tomorrow" stored in day/time field 410 to a specific day of the week. That is, capture logic 320 and/or mapping/output control logic 350 may be aware that the day on which the conversation between Joe and Bill took place was a Thursday and may then determine that the term "tomorrow" uttered during the conversation corresponds to the following day (i.e., Friday).

Further assume that the party at user device 110 selects "yes" to the query at point 620 on timeline 600. Mapping/output control logic 350 may also display a query associated with an address for the meeting at point 630. In this case, capture logic 320 automatically searched the Internet for the location of a Starbucks located closest to Bill's office and displays the location (415 Oak Street in this example) at point 630. Assume that the user selects yes in response to the query at point 630. In this manner, mapping/output control logic 350 may provide captured portions of the conversation in a timeline that may be chronological or nearly chronological. Mapping/output control logic 350 also allows the user to select, confirm or modify information associated with timeline 600. For example, in some instances, the user may wish to change the time of the meeting displayed at point 620. In this case, the user may provide a new time via, for example, text input.

In some implementations, mapping/output control logic 350 may also provide a query at point 640 inquiring as to whether the user would like to send information regarding the meeting with Joe to another application executed by user device 110. For example, in this example in which the user confirmed a future meeting, mapping/output control logic 350 may provide the query at point 640 inquiring as to whether the user would like to send information regarding the meeting to a calendar application on user device 110. Assume that the user selects "yes." In this case, mapping/output control logic 350 may send information regarding the meeting to the calendar application (act 550). The calendar application on user device 110 may then automatically schedule the meeting on the user's calendar and send out text alerts to the user and/or the other party at various intervals prior to the meeting (act 550).

In other instances, mapping/output control logic 350 may inquire as to whether the user would like to add a party's name to his/her address book. For example, in this example, mapping/output control logic 350 may provide a query inquiring as to whether the user would like to add Joe to an address book/contact list application executed by user device 110. In still other instances, mapping/output control logic 350 may automatically send the party's name and contact information to an address book/contact list stored in user device 110 (act 550).

As described above, conversation capture program 300 may identify portions of a conversation and display various portions. The timeline 600 illustrated in FIG. 6A is exemplary only. For example, mapping/output control logic 350 may display information identified during the conversation using thumbnails images/icons or some other graphical display mechanism that includes various portions of the identified information and allows the user to select various portions of the displayed information. In other implementations, mapping/output control logic 350 may provide an exemplary timeline 605, as illustrated in FIG. 6B.

Figure 6B:
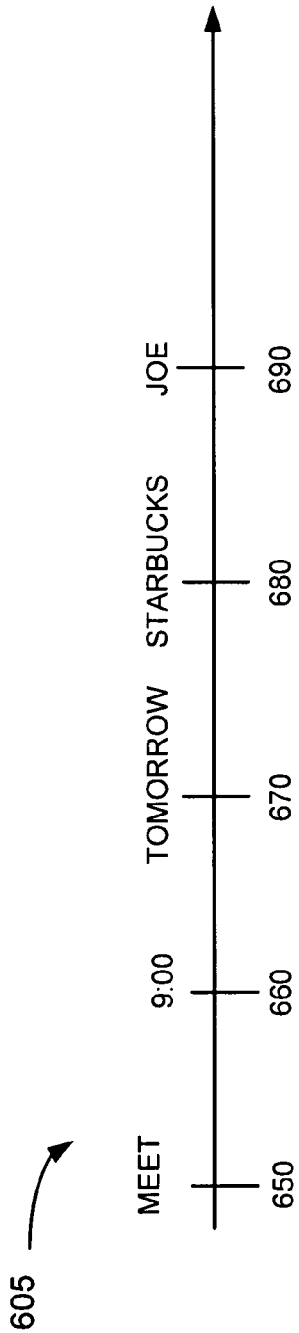

Referring to FIG. 6B, timeline 605 includes points 650-690, which display the terms/phrases "meet," "9:00," "tomorrow," "Starbucks," and "Joe," respectively. These terms correspond to terms identified by capture logic 320 and are displayed in chronological order. That is, these terms are displayed in an order in which they were uttered during the phone conversation or inputted during a text-based conversation. The user of user device 110 may then select one or more of points 650-690 and forward this information to the calendar application in user device 110 (act 540). For example, the user may select 9:00 at point 660, tomorrow at point 670, Starbucks at point 680 and Joe at point 690. Mapping/output control logic 350 may forward this information to a calendar application stored in user device 110 (act 550). The user may also select the name Joe at point 690 for forwarding to a contact list/address book program stored in user device 110.

In some implementations, timeline 605 (or 600) may also provide an indication of who the conversation was with, along with the time and/or date of the conversation using information stored in, for example, other field 460 of database 400. For example, timeline 605 may include a caption, such as "Telephone call from Joe Robinson—11/10/08 @ 3.15 PM.

As described above, in some implementations, conversation capture program 300 may provide graphical output to a user in a timeline-like manner, as illustrated in FIGS. 6A and 6B. In other implementations, conversation capture program 300 may display information regarding conversations in other ways. For example, in one implementation involving a phone conversation, speech recognition logic 310 may perform speech recognition on the entire conversation and generate a transcribed version of the conversation. Mapping/output control logic 350 may then output the entire conversation as illustrated in FIG. 7.

Referring to FIG. 7, mapping output/control logic 350 may provide output 700 via output device 250, which may be an LCD display. Output 700 may include messages 710-770 involving a phone conversation between the party at user device 110 (i.e., Bill in this example) with the party at user device 120 (i.e., Joe in this example). As illustrated, Joe called Bill and provided a typical greeting at message 710. Capture logic 320 may identify the term "Bill" in message 710 and store this name in parties field 430 of database 400. Capture logic 320 may also identify the phrase "server problems" in messages 720 and 730 and the term "patch" in message 730 as being relevant terms since these terms were uttered more than once during the conversation. Capture logic 320 may store these terms/phrases in topics field 450 of database 400. Capture logic 320 may also identify the name "Joe" in messages 740 and 760 and store this information in parties field 430 of database 400. Capture logic 320 may further identify the terms/phrases "meet," "9:00 tomorrow" and "Starbucks" and store these terms/phrases in action field 440, day/time field 410 and location field 420, respectively.

Mapping/output control logic 350 may then output the identified terms/phrases within the transcribed conversation in a highlighted manner or other manner in which the identified terms are displayed in a more prominent or different manner than other portions of the transcribed conversation. For example, in output 700, mapping/output control logic 350 has bolded and capitalized the identified terms/phrases to make them more quickly visible to the viewer at user device 110. In other instances, other types of highlighting may be used to make the identified terms/phrases more prominent or quickly visible to the user. For example, the name "Bill" may be shown in color, shown using a larger font or shown using a different font than other portions of the transcribed conversation. In still other instances, identified portions of messages may be highlighted using asterisks, icons, etc. In addition, in some implementations, various terms/phrases may be displayed in different manners. For example, locations may be displayed in one manner (e.g., via bolding) and action words may be displayed in another manner (e.g., via color).

In addition, similar to the discussion above with respect to FIGS. 6A and 6B, a user may select various highlighted words/phrases in output 700. For example, the user may select the term "meet" displayed in message 750 and mapping/output control logic 350 may provide a query inquiring as to whether the user would like to send information regarding the meeting to a calendar application on user device 110. In the exemplary output 700 illustrated in FIG. 7, the term "meet" in message 750 is underlined, indicating that this term may be selected by the user to provide other options, such as the option to send information associated with the meeting to the calendar application.

In some implementations, conversation capture program 300 may allow a user to select the type of output provided with respect to conversations. For example, conversation capture program 300 may include a user interface to allow the user to select whether he/she would like to view conversation-related information in a time-line like manner, such as one of the timelines illustrated in FIG. 6A or 6B, as a transcribed version of a conversation, as illustrated in FIG. 7, or in other manners. The user may also select the particular type of highlighting used to display relevant information, such as bolding, color, different fonts, underlining, etc. Conversation capture program 300 may then provide output to the user in the user-defined manner.

In each case, conversation capture program 300 strategically identifies information from a conversation and allows the user to view the information associated with a conversation in a manner that allows the user to quickly ascertain information of interest. This may provide the user with a quick overview of a conversation. That is, by eliminating much of a conversation and/or displaying relevant/important information in a manner that is more prominent or visible, the user may be provided with a good overview or gist of the conversation.

Conversation capture program 300 may also facilitate the recalling of information, such as names, telephone numbers, or other information that may have been exchanged during a conversation, at a later time. For example, information stored in database 400 may be accessed by a user long after a conversation has taken place to recall information regarding the conversation, as described in detail below.

Figure 8:
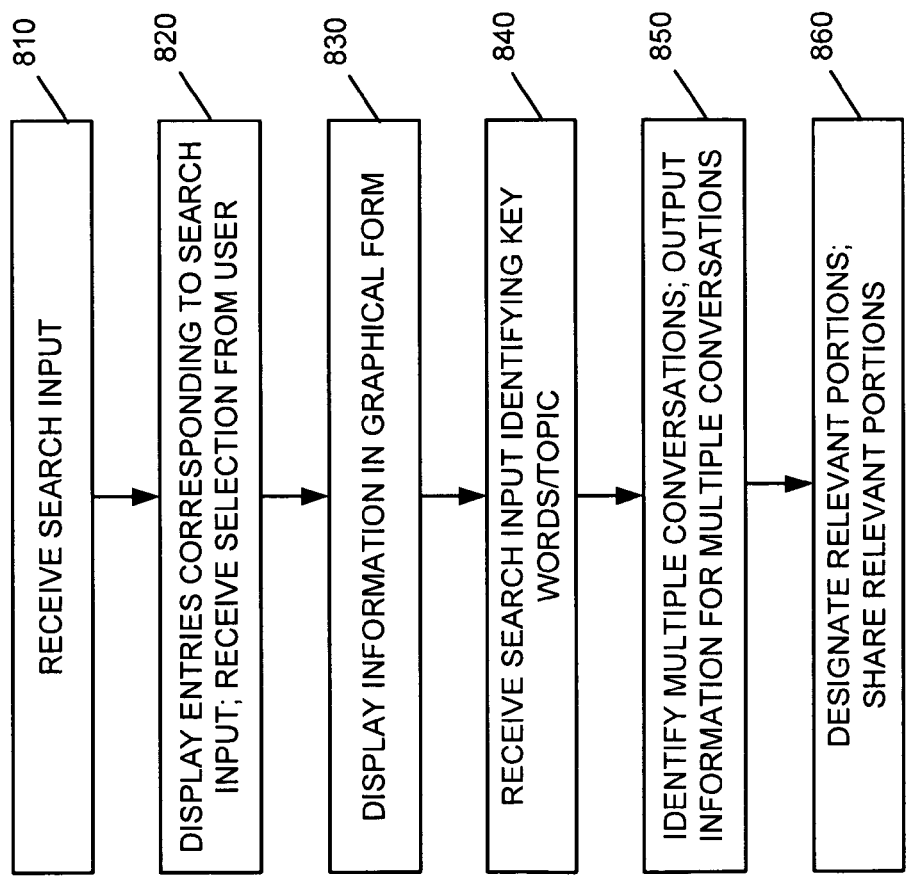
FIG. 8 is a flow diagram illustrating exemplary processing associated with retrieving information stored in the database of FIG. 4.

FIG. 8 illustrates exemplary processing associated with recalling information captured during a conversation. Processing may begin with a party at user device 110 accessing conversation capture program 300. Conversation capture program 300 may include a search option that allows the user to search through extracted portions of conversations stored in database 400. Assume that the user accesses the search option and inputs a search input. For example, assume that the user of user device 110 knows that he/she talked to a number of people during a teleconference with a number of parties on Oct. 1, 2008 and received contact information/telephone numbers of several different people. In this example, the user may input the date of the teleconference as a search input.

Mapping/output control logic 350 may receive the search input (act 810). Mapping/output control logic 350 may then identify one or more entries in database 400 that correspond to conversations the user conducted on that date (act 820). In an instance when more than one entry is stored in database 400 corresponding to the entered data, mapping/output control logic 350 may output a brief portion or snippet of each identified entry in database 400 that satisfies the search input (act 820). The snippet may include a name of a party associated with the conversation, the date/time of the conversation, a location associated with a follow up meeting, etc. Assume that the user selects the entry associated with the teleconference of interest (act 820). Mapping/output control logic 350 may then provide a graphical output of information extracted from the teleconference (act 830).

Figure 9:
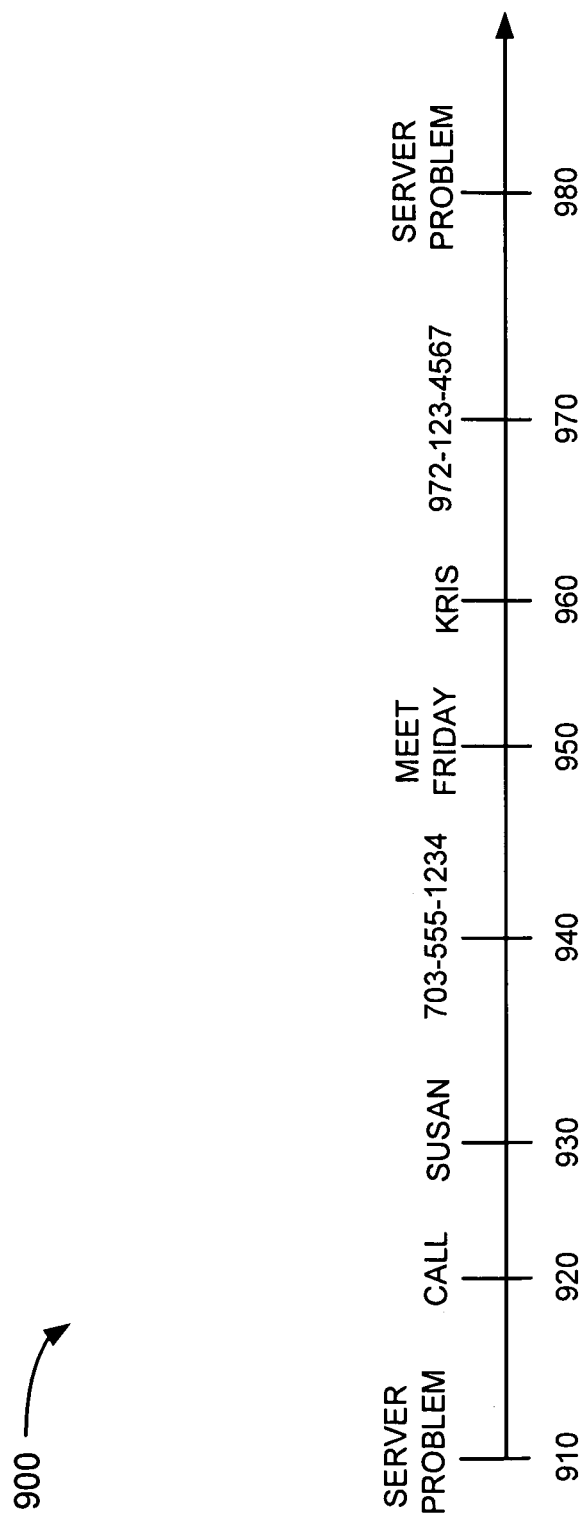
FIG. 9 is an exemplary output associated with the processing of FIG. 8.

For example, FIG. 9 illustrates an exemplary a graphical output 900, also referred to herein as timeline 900, that includes a number of items identified by capture logic 320 and output by mapping/output control logic 350 in a chronological order. Referring to FIG. 9, timeline 900 may indicate a relative (or absolute) time when various information was extracted from the teleconference. For example, items 910-980 may be displayed in an order in which they were spoken (or text inputted) during the teleconference. As illustrated, the phrase "server problem" is provided at points 910 and 980. Action words/phrases of "call" and "meet Friday" are also provided at points 920 and 950, respectively. At point 930, the name Susan is provided and at point 940, a telephone number is provided. Similarly, at point 960, the name Kris is provided, followed by a telephone number at point 970. In addition, in some implementations, timeline 900 may include a caption or title that indicates who the conversation or multi-party conversation was with, along with the date/time of the conversation (e.g., conversation with Susan, Kris, Brian and Heath—10/1/08 at 2:00 PM).

The user may then be able to view chronological timeline 900 and will be able to recall the telephone numbers provided during an earlier teleconference. This may also allow the user to more easily pair up various names and telephone numbers. For example, since the telephone number at point 940 follows the name Susan at point 930, the number at 940 would most likely be associated with Susan.

In some implementations, when searching for information associated with a previous communication session, the search option associated with conversation capture program 300 may allow a user to select particular fields that he/she wishes to have displayed on the chronological timeline. For example, the user may select names and telephone numbers as being information to be displayed in response to a search input. In this case, a display, such as timeline 900 would only include names and telephone numbers. Allowing the user to select what portions of extracted information to be displayed may further facilitate recalling names and telephone numbers by providing a simplified display output.

Conversation capture program 300 may also be used to retrieve conversations that may share common or similar information. For example, conversations between co-workers and/or friends that took place at different times may share similar themes (e.g., football scores, work problems, recipes, etc.). In this case, the user may input a keyword/topic to find related conversations (act 840). As an example, suppose that the user had a number of conversations over a period of time involving a server problem at work. In this case, the user may enter "server problem" as a search input. Mapping/output control logic 350 may receive the search query and identify multiple conversations in database 400 that include the term "server problem" (act 850). Mapping/output control logic 350 may provide the multiple conversations in one or more graphical displays, similar to that illustrated in FIG. 9 (act 850).

Mapping/output control logic 350 may also provide all or some of the multiple displayed conversation-related information to one or more other parties. For example, the user at user device 110 may designate or select all or a portion (e.g., highlighted portions) of the multiple conversations (act 860). Mapping/output control logic 350 may then provide this information to other parties selected by the user (act 860). The information may be provided to the selected parties via email, text message, etc. This may allow various other parties to be provided with information regarding earlier conversations, which may act as abbreviated meeting notes documenting the earlier conversations.

In addition, in some instances, the user at user device 110 may input the name of a contact with whom multiple conversations have taken place over a period of time. Mapping/output control logic 350 may receive the contact name and retrieve the information in database 400 corresponding to the previous conversations with that contact. Mapping/output control logic 350 may also output this information for display to the user in a chronological order. The user may then view the previous interactions/conversations and visually track when various information was provided. For example, the user may be able to visually determine when a telephone number was provided during one of the conversations. In this manner, the user is given a broad view of previous conversations and is able to quickly determine when various information, including key words, names, telephone numbers, etc., were provided.

As described above with respect to FIG. 8, in some implementations, conversation capture program 300 may provide graphical output to a user regarding various conversations in a timeline-like manner, as illustrated in FIG. 9. In other implementations, conversation capture program 300 may display information regarding conversations in other ways. For example, in some implementations, conversation capture program 300 may generate a transcribed version of the conversation and display terms/phrases of interest to the user in the manner illustrated in FIG. 7. Further, in some implementations, conversation capture program 300 may combine elements of a timeline-like display and a transcribed version of a conversation to allow the user to quickly obtain information that may be relevant to the user.

In some implementations, network device 140 may store conversation-related information, as opposed to a user device (e.g., user device 110) storing the conversation-related information. In such implementations, database 400 may be stored on network device 140 and a user may access network device 140 to retrieve the conversation-related information. For example, network device 140 may be a server that stores conversations for a large number of parties. In this case, a user at user device 110 may log onto the network device/server 140 using a user name/password (or other suitable access control mechanism) to retrieve his/her conversation-related information.

In addition, in some implementations, network device 140 may perform all or some of the other functions described above. For example, network device 140 may store conversation capture program 300 and perform the functions of conversation program 300 described above. In such implementations, the user at user device 110 may designate some or all of conversations involving user device 110 as being appropriate for processing by conversation capture program 300. Further, in such implementations, network device 140 may include a gateway or proxy device positioned between the parties involved in the conversation. In this instance, conversation data (e.g., audio or text-based) may be captured and analyzed as it passes between the parties. Alternatively, one or more user devices 110-130 may forward conversation data to network device 140 for capturing/analysis in real time or at a time subsequent to the conversation.

Implementations described herein provide for identifying and storing portions of conversations. The identified portions may then be displayed to a user as an aid in recalling earlier conversations. This may also allow the user to avoid having to keep detailed written notes during a conversation since key information may be recalled at a later time. In addition, various portions of the identified information may be provided to other applications to perform various other functions.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to identifying various information from conversations and displaying the information to a user in a timeline-like manner or as a transcription of a conversation in chronological order. In other implementations, other types of information may be identified or captured during a conversation and displayed in other ways, such as via other graphical ways or via text alone.

In addition, features have been described above as involving voice-based conversations (e.g., phone calls) and text-based conversations. In other implementations, multimedia-based conversations may also be processed as described above. For example, for multi-media conversations in which pictures, videos and/or music files were exchanged, conversation capture program 300 may identify the pictures, videos, music files, or other multi-media files that were exchanged. Conversation capture program 300 may store these files for later display and/or retrieval.

Further, in some implementations, conversation capture program 300 may alert the parties involved in a conversation that portions of the conversation are being stored for later recall. For example, an audio or text alert may be provided to the parties of the conversation prior to conversation capture program 300 identifying and storing portions of the conversation.

In addition, while series of acts have been described with respect to FIGS. 5 and 8, the order of the acts may be varied in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device, comprising:
a communication interface configured to send and receive communications associated with a voice communication session;
a display; and
logic configured to:
identify portions of the voice communication session, wherein the identified portions include at least one of a name or a telephone number,
store the identified portions in a memory,
receive a request from a user of the device to retrieve information associated with the voice communication session, and
output to the display, in response to the request, information associated with the identified portions, wherein when outputting information to the display, the logic is configured to:
output the information via a timeline, the timeline displaying:
first ones of the identified portions in a chronological order corresponding to when the first ones of the identified portions were uttered during the voice communication session, and
a second one of the identified portions in a non-chronological order, wherein the second identified portion is displayed adjacent one of the first identified portions associated with the second identified portion.

2. The device of claim 1, wherein the logic is further configured to:
receive, from a user of the device, input confirming or selecting at least some of the displayed information, and
forward the at least some of the displayed information for processing by an application stored on the device.

3. The device of claim 1, wherein when identifying portions of the voice communication session, the logic is configured to identify at least one of a word or phrase of the voice communication session associated with a subsequent meeting or subsequent voice communication session, and
wherein the logic is further configured to:
include a query in the timeline, the query being associated with the subsequent meeting or subsequent voice communication session.

4. The device of claim 3, wherein the logic is further configured to:
receive an affirmative response to the query, and
forward information associated with the subsequent meeting or subsequent voice communication session to a calendar application stored on the device, in response to receiving the affirmative response.

5. The device of claim 1, wherein the voice communication session comprises a telephone conversation between a user of the device and a first party, and wherein the logic is further configured to:

perform speech recognition associated with speech input provided by the user of the device and the first party.

6. The device of claim 5, wherein when outputting to the display, the logic is configured to:
output a transcribed version of the telephone conversation, wherein information associated with the identified portions is highlighted with respect to other portions of the transcribed version of the telephone conversation.

7. The device of claim 1, wherein the voice communication session comprises a multimedia-based communication session.

8. The device of claim 1, wherein when identifying portions of the voice communication session, the logic is configured to identify at least two of a name, location, time, telephone number, action or topic.

9. The device of claim 1, wherein the logic is further configured to:
store conversation related information associated with a plurality of voice communication sessions in the memory,
receive, from a user of the device, first search input associated with at least a portion of a first one of the plurality of voice communication sessions,
retrieve information associated with the first voice communication session from the memory, and
output, to the display, information associated with the first voice communication session.

10. The device of claim 9, wherein the logic is further configured to:
receive, from the user, second search input associated with at least two of the plurality of voice communication sessions,
retrieve information associated with the at least two voice communication sessions from the memory, and
output, to the display, information associated with the at least two voice communication sessions.

11. The device of claim 1, wherein when storing the identified portions in a memory, the logic is configured to forward the identified portions to the communication interface, and wherein the communication interface is further configured to:
forward the identified portions to an external memory via a network.

12. The device of claim 1, wherein the logic is further configured to:
automatically add a name identified during the voice communication session to a contact list or address book stored on the device.

13. The device of claim 1, wherein when identifying portions of the voice communication session, the logic is configured to identify a name of a person or retail establishment, the logic being further configured to:
automatically access a search program to identify at least one of a telephone number or location associated with the name.

14. A method, comprising:
receiving communications associated with a voice communication session, the voice communication session corresponding to a telephone conversation or a multimedia conversation;
automatically identifying portions of the voice communication session, wherein the identified portions include at least two of a name, a topic or a telephone number;
storing the identified portions;
receiving, from a user of a device, a request to retrieve information associated with the voice communication session; and
providing, to a display and in response to the request, information associated with the identified portions, wherein the providing comprises:
outputting information associated with the identified portions via a timeline, the timeline displaying:
first ones of the identified portions in a chronological order corresponding to when the first ones of the identified portions were spoken during the voice communication session, and
a second one of the identified portions in a non-chronological order, wherein the second identified portion is displayed adjacent one of the first identified portions associated with the second identified portion.

15. The method of claim 14, wherein when the voice communication session comprises a telephone conversation between the user of the device and a first party, the method further comprises:
performing speech recognition associated with speech input provided by the user and the first party, wherein the providing to the display comprises:
outputting a transcribed version of the telephone conversation, wherein information associated with the identified portions is highlighted or displayed in a different or more prominent manner than other portions of the transcribed version of the telephone conversation.

16. The method of claim 14, wherein identifying portions comprises identifying at least two of a name, location, time, telephone number, topic and follow up action, and wherein the providing to the display comprises:
providing the information in a timeline, the timeline indicating a relative time during the voice communication session when the identified portions were spoken.

17. The method of claim 14, further comprising:
capturing conversation related information associated with a plurality of voice communication sessions;
extracting portions of information from the captured conversation related information;
receiving, from a user of the device, first search input associated with at least two of the plurality of voice communication sessions;
retrieving the extracted portions associated with the at least two voice communication sessions; and
providing, to the display, the extracted portions associated with the at least two voice communication sessions.

18. The method of claim 14, wherein the automatically identifying portions comprises:
identifying at least one of pictures, videos or music files.

19. The method of claim 14, wherein the automatically identifying portions of the voice communication session comprises:
identifying at least one of a word or phrase of the voice communication session associated with a subsequent meeting or subsequent voice communication session, and
wherein the outputting information comprises:
including a query in the timeline, the query being associated with the subsequent meeting or subsequent voice communication session.

20. A non-transitory computer-readable medium having stored thereon sequences of instructions which, when executed by at least one processor, cause the at least one processor to:
identify portions of a voice communication session, wherein the identified portions include at least two of a name, a topic or a telephone number;
store the identified portions in a memory;

receive a request to retrieve information associated with the voice communication session; and output, to a display and in response to the request, information associated with the identified portions via a timeline, wherein the timeline:

displays first ones of the identified portions in a chronological order corresponding to when the first ones of the identified portions were spoken during the voice communication session, and displays a second one of the identified portions in a non-chronological order, wherein the second identified portion is displayed adjacent one of the first identified portions associated with the second identified portion.

21. The non-transitory computer-readable medium of claim 20, further including instructions for causing the at least one processor to:

perform speech recognition for the voice communication session, wherein the instructions for causing the at least one processor to output information cause the at least one processor to:

output a transcribed version of the voice communication session, wherein information associated with the identified portions is highlighted or displayed in a different or more prominent manner than other portions of the transcribed version of the voice communication session.

22. The non-transitory computer-readable medium of claim 20, further including instructions for causing the at least one processor to:

store time information associated with each of the identified portions, the time information indicating a relative or absolute time during the voice communication session when the identified portions were spoken; and output the information associated with the first one of the identified portions based on the stored time information.

23. The non-transitory computer-readable medium of claim 20, further including instructions for causing the at least one processor to:

store conversation information associated with a plurality of voice communication sessions;

receive search input associated with at least two of the voice communication sessions;

retrieve information associated with the at least two voice communication sessions; and output, to the display, information associated with the at least two voice communication sessions.

24. The non-transitory computer-readable medium of claim 20, wherein when identifying portions, the instructions cause the at least one processor to:

identify at least one of pictures, videos or music files.

* * * * *